US009356706B2

(12) United States Patent
Stolarczyk et al.

(10) Patent No.: US 9,356,706 B2
(45) Date of Patent: May 31, 2016

(54) FIRST RESPONDER AND MINE EMERGENCY COMMUNICATION

(71) Applicant: Stolar, Inc., Raton, NM (US)

(72) Inventors: Larry G. Stolarczyk, Raton, NM (US); Igor Bausov, Raton, NM (US)

(73) Assignee: Stolar, Inc., Raton, NM (US)

( * ) Notice: Subject to any disclaimer, the term of this patent is extended or adjusted under 35 U.S.C. 154(b) by 35 days.

(21) Appl. No.: 14/555,519

(22) Filed: Nov. 26, 2014

(65) Prior Publication Data

US 2015/0126106 A1    May 7, 2015

Related U.S. Application Data

(60) Provisional application No. 61/988,847, filed on May 5, 2014.

(51) Int. Cl.

| | |
|---|---|
| *H04B 7/15* | (2006.01) |
| *H04B 13/02* | (2006.01) |
| *H04B 7/155* | (2006.01) |
| *H04B 1/3827* | (2015.01) |

(52) U.S. Cl.
CPC ............ *H04B 13/02* (2013.01); *H04B 7/15514* (2013.01); *H04B 7/15528* (2013.01); *H04B 7/15557* (2013.01); *H04B 2001/3866* (2013.01)

(58) Field of Classification Search
CPC .... H04B 13/02; H04B 5/0068; H04B 5/0081; H04B 7/15557; H04B 1/385; H04B 3/58; H04B 5/02
USPC .......... 455/11.1, 7, 13.1, 13.4, 20, 21, 22, 23, 455/25, 73, 445, 575.1, 550.1, 403, 422.1, 455/426.1, 426.2, 40, 39, 500, 517; 375/211, 213; 340/539.13, 573.1, 340/572.1, 825.36

See application file for complete search history.

(56) References Cited

U.S. PATENT DOCUMENTS

| | | | | |
|---|---|---|---|---|
| 7,420,471 | B2* | 9/2008 | Frederick | ................ E21C 35/24 250/239 |
| 8,115,622 | B2* | 2/2012 | Stolarczyk | ............... H01Q 1/04 340/539.13 |
| 2004/0266497 | A1* | 12/2004 | Reagor | .................. H04B 13/02 455/575.1 |

\* cited by examiner

*Primary Examiner* — Keith Ferguson
(74) *Attorney, Agent, or Firm* — Richard B. Main; Main Law Cafe (57) ABSTRACT

An underground mine communications upgrade comprises an independent VHF-UHF band to MF band repeater-transceiver translator (RTT) and loop antenna added to a conventional miner's cap-lamp and helmet. VHF/UHF band communications with nearby conventional handsets are translated to medium frequency (MF band) communications that couple mine-wide to copper-core life-lines in all the entries. Such life-lines also do well supporting ultra low frequency (ULF), through-the-earth (TTE) communications with the surface above. Roof mounted borehole MF band ULF RTT's are coupled to the dual-frequency life-lines and bridge the MF band communications on the life-lines with the ULF communications on the life-lines. The MF band radio traffic primarily consists of digital packetswitch communications. Both the cap-lamp and borehole RTT's translate between the types of modulation used on the VHF/UHF band handsets, and also the types of modulation used on the ULF TTE surface communications, with the MF band digital packetswitch communications.

11 Claims, 4 Drawing Sheets

FIRST RESPONDER AND MINE EMERGENCY COMMUNICATION

FIELD OF THE INVENTION

The present invention relates to first responder and mine emergency communications systems, and more particularly to mobile radio repeaters capable of helping such communications penetrate throughout large closed buildings, collapsed structures, and underground mines.

DESCRIPTION OF THE PRIOR ART

First responder and underground miners VHF/UHF band handset and mobile phone communications are used everywhere by most everyone. But their high frequency signals are line-of-sight and do not penetrate well through concrete, stone, rock, and soils. That fact will completely stymie first responders needing to communicate with others inside large closed buildings, collapsed structures, and underground mines. Even when both ends are otherwise very close together.

Radio repeaters are everywhere to enable communications inside buildings and subways with the outside world. Even the San Francisco Bay Area Rapid Transit (BART) operates hundreds of repeaters so their riders can continue to use their mobile phones in BART's underground subway stations and tunnels. Large buildings and venues too do this for the same reasons. But when the power fails or the whole structure is disrupted, the repeaters go down too.

Public safety agencies primarily rely on land mobile radio systems for their first responder communications. But these agencies use different frequency bands, different modulation types, and both conventional and trunked systems, and in multi-agency incident responses these incompatibilities invariably lead to communications chaos. Software-defined radio (SDR) technology is viewed by many as a solution.

In SDR's, software can be used to control modulation choices, transmit frequencies, bandwidth, transmit power levels, and other radio frequency operating parameters. Smart (or Cognitive) radios can for respond to their environments by dynamically adjusting their power output, modulation, channel plan, network protocol, and other characteristics to make themselves compatible with what's happening at the moment. How fast they can adapt and how much they lose or miss while adapting depends on the hardware, devices, and the engineering design.

Kutta Radio (Phoenix, Ariz.) recognized the simple radio communications problems that can suddenly descend in collapsed underground mines, and now markets their Kutta DRUM repeater. It is a simple analog translator between VHF/UHF band frequencies and medium frequency (MF band) carriers. The repeaters themselves are portable and built into lunchboxes that need to be preinstalled throughout an underground mine and powered up. Unfortunately, because transmission path attenuation is very low, simultaneous MF band transmissions from multiple repeaters in the transmission path collide in the time, degrading communications quality.

As it happens MF band carriers easily induce current flow in electrical conductors and will be carried rather long distances by the rebar, pipes, conduits, wires, cables, metal frames, conveyers, elevator shafts, ducting, rails, and other conductive structures that are so common in buildings, public infrastructures, and even underground mines and tunnels.

Conventional communication systems used underground in mines generally rely on VHF/UHF band handheld radio transceivers and more modern caplamp or hardhat mounted units. Coaxial cables with slots cut through their shields universally provide a "leaky feeder" for these VHF/UHF band radios throughout mines and tunnels. Both voice and basic data communications are supported.

In a "mesh wireless", individual VHF/UHF band transceivers pick up and retransmit signals amongst their neighbors, to boost range and throughput. The method depends on the nodes being close enough together and no obstructions between them like an earth collapse.

The reliance on VHF/UHF band carriers means the communication ranges will be very short underground without a functioning leaky feeder coax. Collapses and other disruptions can isolate trapped miners by breaking or otherwise robbing the system of its wire links.

The present inventors describe in U.S. Pat. No. 8,542,114, issued Sep. 24, 2013, how different types of underground radio service can take advantage of naturally occurring and man-made waveguides and conductive links that are common in all mines. Most of these were not placed there to support radio communications. The patent describes in particular, a wearable cap-lamp that can be integrated with an LED headlight and a transceiver switchable between 200-300 kHz (ULF) and 2000 kHz (MF band). The design could also be a hockey-puck design with self contained batteries and clipped to a commercially designed hard hat lamp.

In practice, miners, management, and rescuers are all equipped with and highly familiar with portable VHF/UHF band handheld transceivers. They use these everyday as their primary communications system. More recently, advances in electronics have allowed very compact VHF/UHF band transceivers to be clipped to or otherwise mounted on a conventional hardhat with an LED long life headlamp. These made the wearable cap-lamp of U.S. Pat. No. 8,542,114, redundant and necessary only during emergencies.

Mine infrastructure development plans for metal and non-metal mines are different from those for coal mines. Metal and non-metal mines develop very few adits or shafts into the working levels of the ore body. In contrast, coal mines are developed with multiple parallel entries into a block of virgin coal. In metal and non-metal mines, UHF leaky feeder infrastructure can be used to provide mine-wide coverage areas.

As a rule, most of the underground personnel will be deployed to the working face area, which by definition at the far ends of a mine communication system. Other workers will be scattered around doing construction and maintenance tasks. Emergencies often occur where there are concentrations of energy in the mining complex. These are where fires, roof collapses, and explosions are most likely to occur. Accidents are most likely to occur in travel ways, product transportation entries, and/or the work face area. Primary communications systems using leaky-feeder radios or hard-wired pager telephones will most likely be destroyed or disabled in a mine emergency. All means of communication with trapped or miners-in-motion will often be completely cut off.

What is needed, and is described herein, is an enhancement that provides way for the conventional VHF/UHF band transceivers already being universally used to continue in operation. The disrupted radio links need to be automatically bridged across obstructions and to be carried through to rescuers and the surface. We propose to do just that by enlisting into service the naturally occurring waveguides and conductive links that are common in all mines. The bridging and switchover must be seamless and transparent so that the operation of them does not distract from rescue efforts.

SUMMARY OF THE INVENTION

Briefly, a first responders' and underground mine communications enhancement embodiment of the present invention comprises an independent VHF-UHF band to MF band repeater-transceiver translator (RTT) and loop antenna added to a conventional miner's cap-lamp and helmet. VHF/UHF band communications with nearby conventional handsets are translated to medium frequency (MF band) communications that couple well mine-wide to copper-core life-lines in all the entries. Such life-lines also support ultra low frequency (ULF), through-the-earth (TTE) communications with the surface above. Roof mounted borehole MF band ULF RTT's are coupled to the dual-frequency life-lines and bridge the MF band communications on the life-lines with the ULF communications on the life-lines. The MF band radio traffic primarily consists of digital packetswitch communications. Both the cap-lamp and borehole RTT's translate between the types of modulation used on the VHF/UHF band handsets, and also the types of modulation used on the ULF TTE surface communications, with the MF band digital packetswitch communications.

These and other objects and advantages of the present invention no doubt become obvious to those of ordinary skill in the art after having read the following detailed description of the preferred embodiments which are illustrated in the various drawing figures.

DETAILED DESCRIPTION OF THE PREFERRED EMBODIMENT

Figure 1:
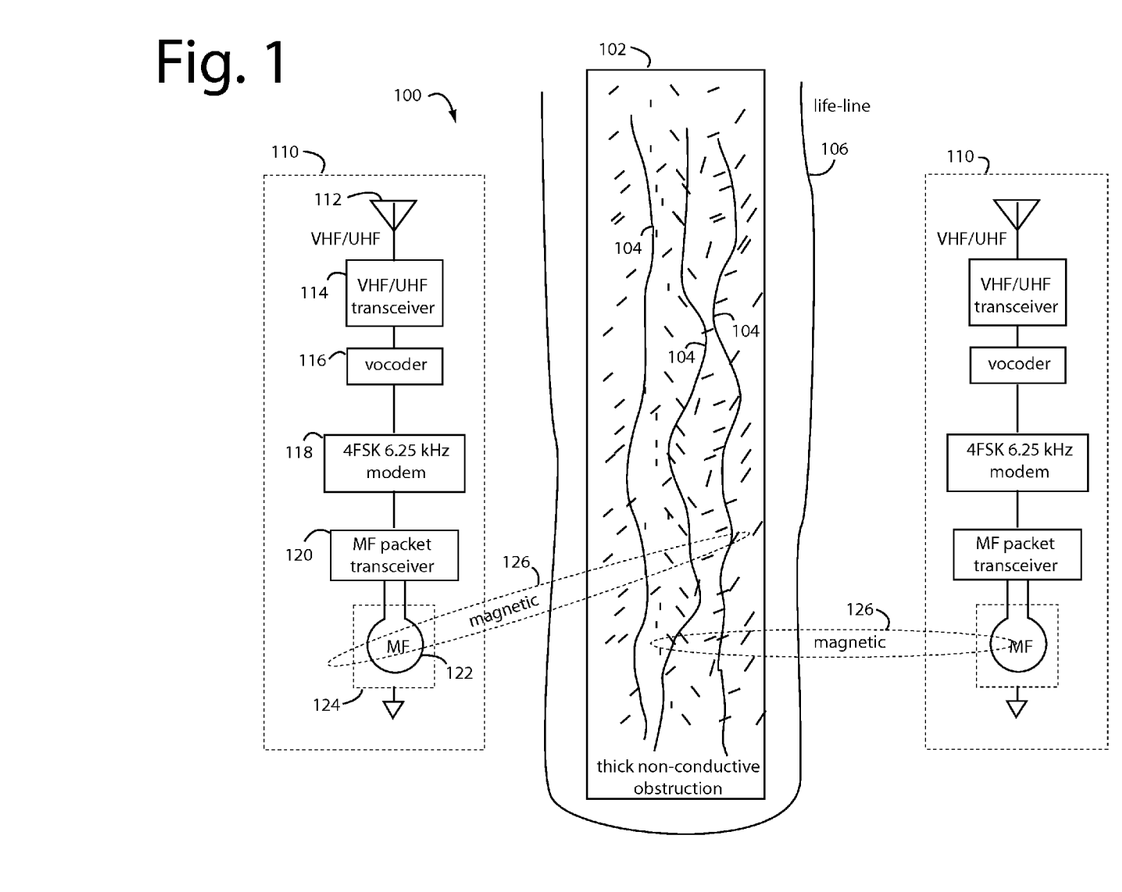
FIG. 1 is a functional block diagram of a first responders' and miners' communications embodiment that can help enhance and enable communications with survivors and enable self-escape after serious disruptions in buildings, structures, tunnels, and underground mines.

FIG. 1 represents a wireless bridge repeater system 100 for enhancing a first responder's VHF/UHF band type primary communications system to make rescuers' communications survivable in the face of serious building, public infrastructure, tunnel, and mining catastrophes. An obstruction to VHF/UHF band radio communication is represented by a very large chunk of concrete 102. It could just as easily be the soils and rocks within which a mine or tunnel is constructed, or the heaping rubble of a collapsed or inaccessible building.

Unfortunately, the line-of-sight VHF/UHF band radio handsets used around the Country by police, fire, rescue, ambulance, search, air support, and other "first responders" use a variety of channel frequencies in the VHF and UHF spectrums, and use many different kinds of access and modulation schemes including frequency modulation (FM), Time Division Multiple Access (TDMA), Frequency Division Multiple Access (FDMA), four level frequency shift keying (4FSK), selective calling, and even mobile phones. If more than one department shows up, they generally can't talk to each other because of the incompatibilities. Some conventional radio transceivers can receive both analog and digital mode signals on a single channel and automatically select the received mode to reply to a received call. But that hasn't solved this particular problem.

These buildings, public infrastructures, venues, tunnels, and mines will invariably be randomly or systematically threaded, woven or embedded with long linear conductors 104. Such conductors 104 include local area network equipment, rebar, pipes, conduits, wires, cables, metal frames, conveyers, elevator shafts, ducting, rails, and other conductive structures that are so common in buildings, public infrastructures, and even underground mines and tunnels.

A conductive-core plastic cord 106 is either pre-deployed or rolled out on arrival of first responders around whole buildings, down hallways, through mine entries and crosscuts, or shot up to or over the rescue site with a grappling hook launcher. The first responders communications from the surface above a mine already predisposed with a conductive-core plastic cord 106 inside could benefit by the first responders rolling out more on the surface when they arrive.

Identical, wearable, digital repeater bridges 110 each include a VHF/UHF band antenna 112, a VHF/UHF band radio transceiver chip 114, a vocoder chip 116, a 4FSK 6.25 kHz modem chip 118, a MF band radio frequency packet switch transceiver 120, and a resonant MF band frequency loop antenna 122 operated as an essentially vertical magnetic dipole with an electrostatic shield 124.

The VHF/UHF band radio transceiver chip 114 represents a software defined radio (SDR) that can dynamically reload software function images that define any of the different, incompatible kinds of VHF/UHF band radio handsets that first responders can show up with at a rescue site. Basic SDR technology is conventional and need not be detailed further herein. SDR technology in general is evolving and improving rapidly, and the semiconductor hardware devices and chips to support SDR operation are reaching higher frequencies, scaling up, reducing costs, and reduced battery power.

Electric field shielding is applied on the surface of the 3-axis receiver. The brim loop antenna electric field component loop antenna induces current flow in nearby conductors. The transmitting mode of the brim loop antennas must be unshielded. All along the conductors, current flow generates circular magnetic fields that thread the loop area of the destination receiver—the fact that field induces current flow and the magnetic field induces EMF voltage in the receiving coil is overlooked by most.

Electrostatic shields 124 help a lot to screen out radio frequency interference (RFI). Such magnetic couplings 126 will usually only need to bridge a hundred feet or less. Unobstructed, the VHF/UHF band radio communication can travel line-of-sight for many miles. MF band radio signals induced into random conductors 104 and/or conductive-core plastic cords 106 can travel along them miles underground or through concrete, rubble, rocks, and soils.

The repeaters 110 themselves are worn clipped onto hardhats, on belts, or stitched into vests. The repeaters 110 will automatically pickup any nearby VHF/UHF band communications and convert the demodulated and/or decoded voice with vocoder 116 to symbols for 4FSK encoding by modem 118 and retransmission as MF band frequency digital packets by transceiver 120. At the other end, the same kind of repeater 110 will convert back to the original VHF/UHF band radio communication. First responders and others with conventional VHF/UHF band handsets will never be the wiser. When wireless bridge repeater system 100 is working well and doing its job, it is 100% transparent and automatic.

A good 4FSK modem chip to use includes a media access control (MAC) and a vocoder is marketed by CML Microcircuits PLC (UK and Singapore) as their CMX8341 Analog/

Digital PMR (dPMR) baseband processor. CML makes other chips which can be integrated into even more powerful and flexible configurations.

Although it changes a few times a year, CML says their 8341FI-1.x Function Image™ (FI) implements a half-duplex digital PMR processor including: 4FSK modem, a much of the dPMR Air Interface; Physical, Data Link and Control layers, and an embedded low bit rate RALCWI Vocoder. When used with a suitable host and a limiter/discriminator based RF transceiver, a compact, low cost, low power digital PMR radio conforming to ETSI's dPMR standard TS 102 490 can be realized. Both ISF and CSF configurations are supported, including built-in support for BCD addressing modes. Dual mode, analogue/digital PMR operation can also be achieved with the CMX8341. The device is also compatible with ETSI's dPMR standard TS 102 658 for Mode-1 operation. The CMX8341 manages voice and data systems autonomously, including the Vocoder, and thereby minimizes the load on a host microcontroller and reduce operating power and improve battery life for dPMR radio service.

The CMX8341 uses CML's proprietary FirmASIC® component technology where on-chip sub-systems are configured by a Function Image™. A data file is uploaded during device initialization to define the device's function and feature set. The Function Image™ can be loaded automatically from an external serial memory or host μController over a built-in C-BUS serial interface. Two auxiliary ADCs are included with four selectable inputs and four auxiliary DAC interfaces. The device has flexible power saving modes and is available in the L8 (LQFP) package.

The Physical, Data Link and Control layers in the CMX8341 help to civilize and control access to the MF band frequency local area network carried by linear conductors 104 and conductor-core cords 106. When devices attempt to use a medium simultaneously, frame collisions occur. Data-link protocols are used specify how devices detect and recover from such collisions. They may provide mechanisms to reduce or prevent them, and thereby eliminate VHF/UHF band to MF band repeater stumbling and tangling that would occur otherwise.

So-called "primary communications systems" are used daily by miners for underground and surface communications throughout their shifts. These are typically hand-held devices operating in conventional radio bands, e.g., very high frequency (VHF band, 30-MHz to 300-MHz), ultrahigh frequency (UHF band, 300-MHz to 3-GHz), 2.4 GHz, and 5.8 GHz. Common "Leaky Feeder" and node-based systems are typical primary systems. Secondary communications systems often choose to operate in nonconventional frequency bands (100 Hz to 1 MHz), and most are not readily portable. They are, however, more likely to keep operating following a mine accident or disaster. Conventional medium frequency (MF band 300-kHz to 3-MHz) and ultra low frequency (ULF band, 300 to 3-kHz) through-the-earth (TTE) systems are examples of secondary systems that can provide survivable alternative paths to primary communication systems.

Figure 2:
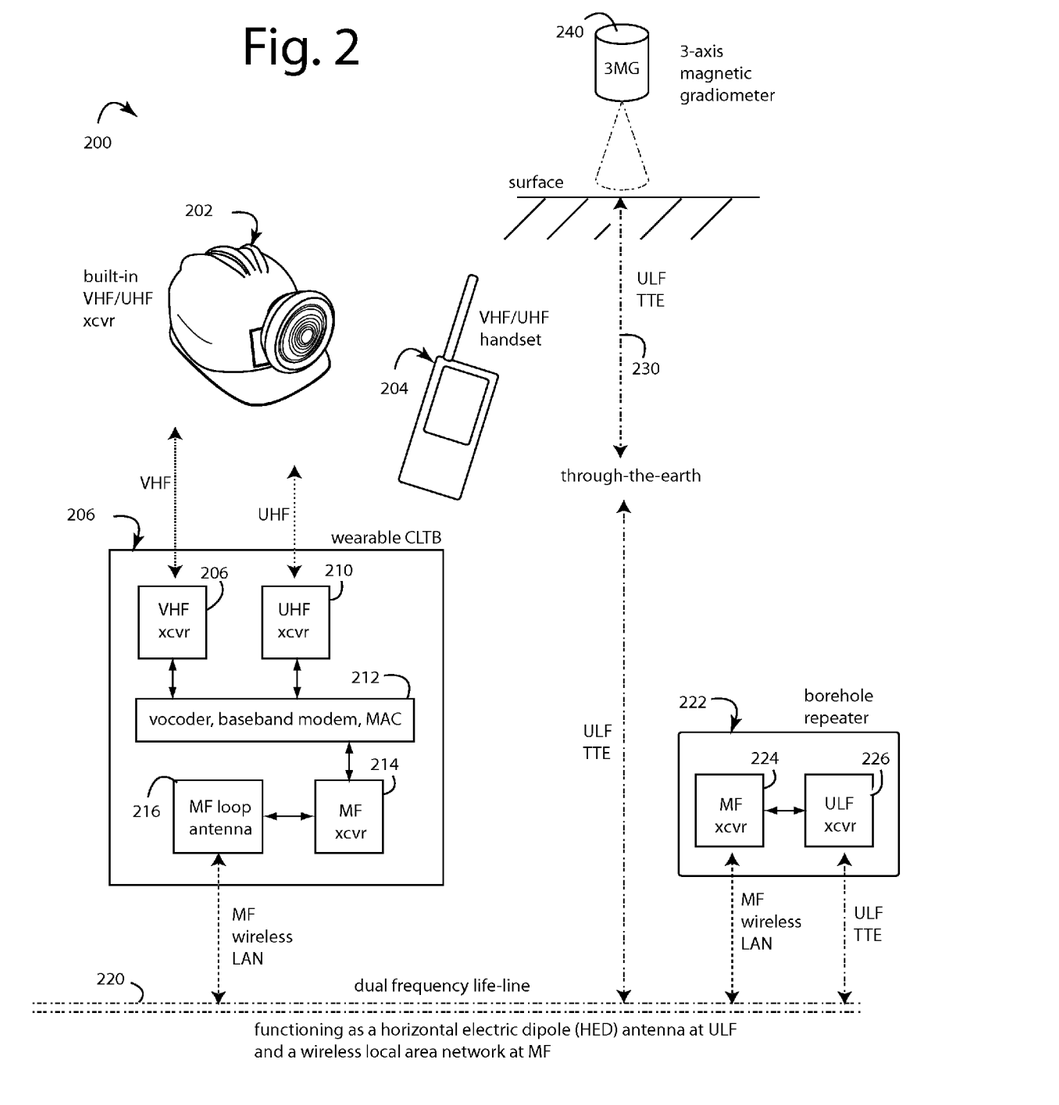
FIG. 2 is a functional block diagram of a cap-lamp transceiver bridge in an embodiment of the present invention.

FIG. 2 represents an underground mine communications system 200 for expanding primary leaky-feeder type and mesh type radio systems with a survivable, post-accident, self-escape (SPASE) communications and tracking capability. Here, a conventional VHF/UHF band radio system is built into or clipped onto a typical caplamp helmet 202. Others simply use an ordinary VHF/UHF band handset 204. A wearable caplamp transceiver bridge (CLTB) 206, in an embodiment of the present invention, is built into a lightweight package that can be clipped to caplamp helmet 202, worn by a coal miner on their utility belt, or sewn into a safety vest.

The CLTB 206 includes a very high frequency (VHF) radio transceiver 208, an ultra-high frequency (UHF) radio transceiver 210, a combination vocoder, baseband modem, MAC unit 212, a medium frequency (MF band) radio transceiver 214, and a shielded MF band resonant loop antenna 216. All but the loop antenna are fully disposed within a compact plastic housing with a rechargeable battery.

A dual frequency (MF band ULF) "life-line" 220 is physically distributed throughout an underground mine. It visually provides bright colored markers to guide trapped miners to the way out during emergencies. Life-line 230 includes a simple conductor ribbon or wire core for carrying ultra-low frequency (ULF) and MF band radio communications between CLTB 206 and any other points along its length. For example, to a bore-hole roof mountable MF band to ULF band repeater transceiver bridge (RTB) 222.

The bore-hole roof mountable MF band to ULF band RTB 222 includes an MF band transceiver 224 connected to an ultra-low frequency (ULF) transceiver 226. ULF communications work on life-line 220 to act as a horizontal electric dipole (HED) antenna that radiates TTE communications 230 to the surface over the mine, e.g., zenith.

Sun spot activity, other phenomena, and interference from lightning strikes in the atmosphere will bury the faint ULF TTE signals from below in radio frequency interface (RFI) noise. Ordinary receivers and antennas fall short and fail in real applications. Very few artisans have understood why. Transmitters however are a different story. Transmissions from conventional transmitters and antennas on the surface can reach life-lines 230 bore-hole roof mountable ULF to MF band repeater transceiver bridges (RTB) 222. The noise environment deep in a mine is a lot quieter, and the sensitivity and noise rejection capabilities of a gradiometer are not needed down below.

A three axis (aka tri-axis) magnetic gradiometer 240 is needed above on the ground surface for the noise rejection and sensitivity it uniquely provides to detect ULF TTE slow rate digital transmissions from deep below. In simple terms, each of the three axes of the antennas is implemented with an electrostatically shielded ferrite rod antenna set orthogonal to the others. A Helmholtz coil calibrator is used to match and calibrate antenna pairs so the nulls obtained in their differential configurations is the highest quality possible.

One pair of tri-axis gradiometer antenna elements cantilevered out at each end of a long portable boom and are separated by a distance (D). Each is oriented identically on the ends of the long boom which can be 10' to 20' long. Reception on the surface by the included receiver will be best when the gradiometer is orthogonal to and stationed zenith to a mine entry below that has a life-life embodiment of the present invention operating as an HED transmitting antenna at ULF. The gradiometer receiver detection sensitivity generally increases by 6-dB for each doubling of distance D, that is up until "D" equals the depth.

The ULF magnetic fields that radiate from such life-line HED antennas will naturally include orthogonal components. A vertical polarized magnetic field ($H_y$) component will deposit oppositely polarized EMF signals in each of the vertical magnetic dipole (VMD) antenna coils of the gradiometer. When differentially connected, the gradiometer coils will sum the two in-phase EMF signals together with a passive gain of 6-dB and will suppress any plane-wave radio frequency interference (RFI) noise fields.

Gradiometric processing takes the derivative of the plane wave front noise (N). Since the derivative of a constant is zero, gradiometric processes suppress problematic RFI noise that can otherwise engulf signal (S) received from deep below the surface. The suppression can exceed 60-dB (e.g., −198 dB re 1 A/m). Gradiometer horizontal magnetic dipole (HMD) and VMD antenna pairs are differentially connected to gain up to 60-dB of suppression of the spatial varying RFI noise current density ($J_M$).

The RFI noise vectors will thread each pair of magnetic dipole antennas in an enclosed surface area (A) at identical angles. The EMF signals in each antenna coil are phase coherent with respect to the other. When such are differentially connected, the EMF in the coils will produce a null of more than 60-dB. Since the pair of gradiometer three axis antennas are physically separated in distance, the arriving TTE cylindrically spreading wave front will have opposite-polarity, horizontal and vertical magnetic fields as vectors.

The radio frequencies used by continuous miners and the remote control transmitters that shearers use are generally between 78 MHz and 1.5 GHz. The operating frequencies of TTE (e.g., 2 kHz to 10 kHz) are far enough below those of the remote control frequencies to avoid interference. The TTE signals will therefore not cause any interference to other equipment.

Device 212 may also include a speech synthesizer for converting text and data messages incoming from any of the receivers into voice. The synthesized voice is transmitted out on the VHF channels for a nearby user to hear. This can be important when such user is unable or barred from reading the text and data messages on screen, e.g., by too much smoke in the chamber or tunnel.

Figure 3:
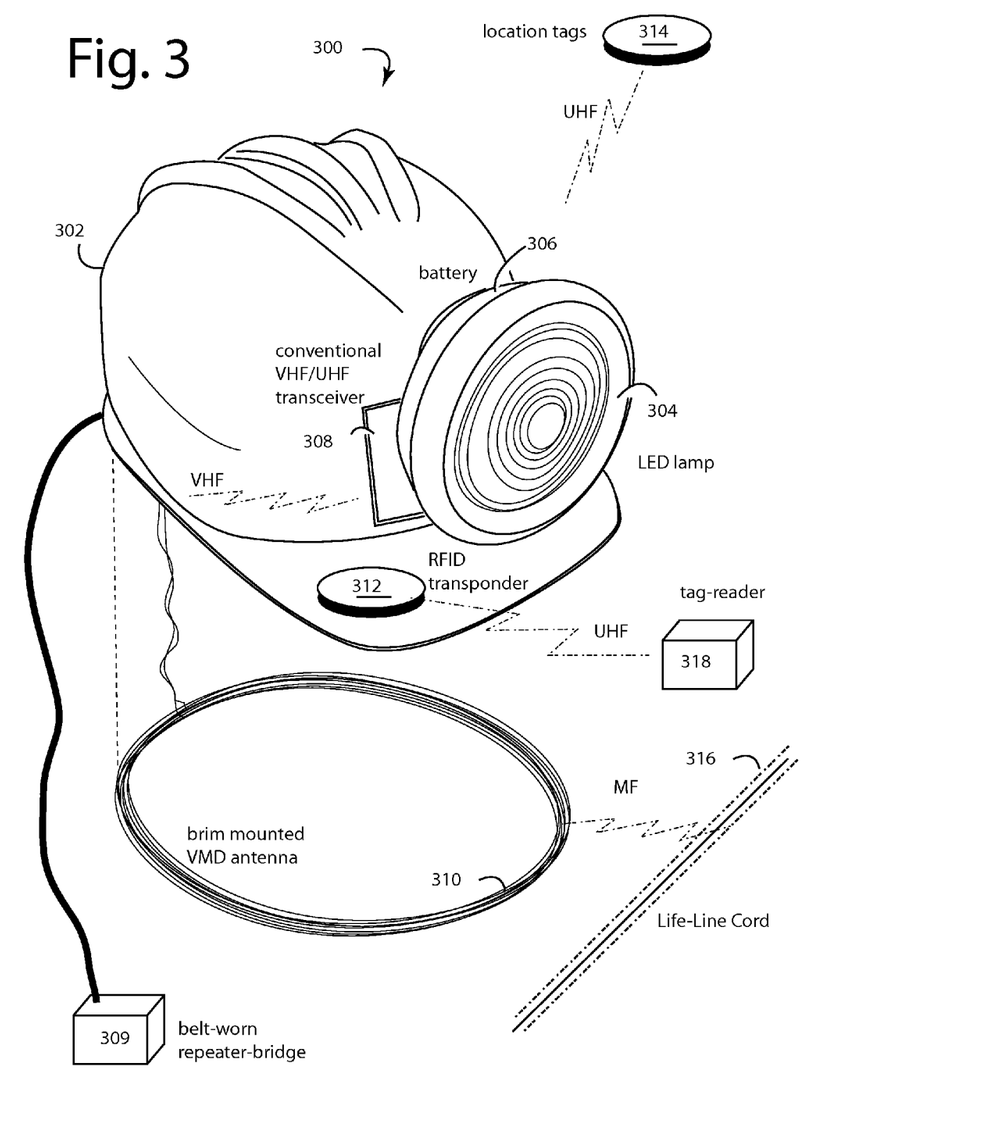
FIG. 3 is a perspective view diagram of a cap-lamp and a brim VMD antenna in an embodiment of the present invention that mounts the CLTB on a user's belt.

FIG. 3 represents a cap-lamp 300 in an embodiment of the present invention. Cap-lamp 300 comprises a hard plastic shell 302 to which are mounted an LED lamp 304, and a rechargeable battery 306. A VHF/UHF band radio transceiver 308 provides two-way voice, data, and SMS text communication. A belt worn MF band VHF/UHF band repeater-bridge 309 and battery are connected up to a brim-mounted, air-core vertical magnetic dipole (VMD) antenna 310.

A wayside VHF/UHF band transmitter periodically bursts a wireless signal to the caplamp identifies the locations of self-escaping miners. A passive RFID disk transponder 312 provides electronic, wireless identification of the registered miner wearing the cap-lamp. Passive RFID disk transponders 314 are stationed at fixed, surveyed locations throughout a mine. E.g., every 200-feet along the conductor waveguide 316. Their burst transmissions are encoded with location information that can be read-in through the VMD antenna 310 and transceiver 308. Such information is interpreted to inform the miner wearing the cap-lamp where they are in the mine.

If any conductor waveguide or mine wiring 316 is nearby, or another type of virtual waveguide is possible, the VMD antenna 310 and transceiver 308 can establish a radio link for voice and/or digital packet communication with the surface operations centers. Peer-to-peer communications are also possible. The VHF/UHF band wayside transceiver is configured to periodically burst a radio wave.

Life-lines 106, 220, and 316 can be so-called "Yellow-CAT" lifelines capable of supporting low frequency (LF) Hill-Wait bifilar transmission mode. They are often installed in any of the entries of a mining complex. A Yellow-CAT cable is augmented with a multi-fiberoptic cable for very wide bandwidth transmission.

There are important differences among operational communications, emergency, and post-accident communications. Operational communications usually require a wide bandwidth VHF/UHF band transmission infrastructure. For example, multiple voice channels in man and material travel ways, continuous video coverage of belt transfer points, and monitoring/control of equipment. High-speed data transmission networks are required because automated machines move faster than miners can react. A wide bandwidth VHF/UHF band facility can thus improve operational safety and productivity.

Emergency and post-accident communication requirements are vastly different. Dangerous situations can develop, and miners need to escape least they become trapped. Full, mine-wide network coverage is required to support post-accident communications and tracking of the miners who will be on the move. Miners trying to escape must often pass through smoke-filled, sooty, and low visibility escape-way environments while wearing clumsy facemask, mouthpiece, and breathing devices. For this reason, the caplamp VHF/UHF band link to the near by (arms length) VHF/UHF band radio provides voice messages to self-escaping miners.

To insure maintainability in emergency situations, the secondary voice communications and tracking functions must be integrated for miners on the move. Any surface situation-awareness center (SAC) must know the escape routes available and current locations for each miner to help them escape.

Trapped, underground miners trying to escape are often unpredictable given a number of escape-ways. So, every entry must be fitted with medium frequency distributed antenna and transmission path infrastructures integrated with conductors and lifeline waveguides. Helping miners escape requires being able to track them, text with them, and talk with them all along their exit to the surface.

One weakness and vulnerability of UHF mesh and VHF leaky feeder network electronics is their batteries and charger equipment must be typically installed at 500-foot intervals in the man and material transportation entries, and at the working face-area. That is, to maintain continuous coverage. When explosive accidents occur, very large number of batteries may become ignition sources of concern to rescue teams.

FIG. 3 shows a cap-lamp transceiver 308 that can periodically power up in a burst-beacon transmission to illuminate any nearby RFID tags 314. Wayside transmitters can be used instead. Return transmissions from the RFID tags to the cap-lamp transceivers provide encoded location information. Digital packet switching transmissions from the cap-lamps timestamp the location information and report it to the surface over the network. Cap-lamp transceivers often include a detachable hand-held display to support text messaging and can further include speakers and microphones for an audio interface.

Portable ULF through-the-earth transceivers with text messaging and synthetic-voice transmission are preferably positioned at self-contained self rescuer (SCSR) caches and refuge chambers. Bridge repeaters 222 (FIG. 2) are used to create wireless links between MF band and ULF transmission infrastructure.

Medium-frequency radio systems have been installed, maintained, and operated in many western American coal and metal/non-metal mines. These systems provided radio coverage in the passageways of both large and medium-sized mines. Electric locomotive cars and diesel powered vehicles provided transportation in these mines. Already installed electrical conductors in the man and material entries, conveyor belt entries, shafts, and tunnels shaped a strong MF band distributed antenna and signal transmission system.

A cap-lamp transceiver may have its own battery and clipped to or integrated into the light emitting diode (LED) lamp and battery assembly. The transceiver, lamp and battery are mounted to a miner's helmet. An air-core vertical magnetic dipole (VMD) is mounted on the miner's helmet. A tracking capability is preferably built into an MF mesh network.

Portable transceivers were installed at power centers supplying power to the face area. Repeater transceivers were installed at the power centers supplying power to conveyor belt drives of the longwall panels. Repeaters were installed in man and material roadways at separation distances of approximately 5,000-feet because the attenuation rate is only 2-dB/km. Vehicular transceivers communicated via the installed infrastructure of large diameter, three-phase power distribution and messenger cables. Pager telephone cables also provided a transmission facility. The installed cables and conveyor belt structure created a distributed antenna and signal transmission path for the communications system. Repeaters supported push-to-talk transmission in the simplex/half-duplex mode. Separate transmit and receive frequencies were supported in the roadway distribution system by sets of transceivers with four separate operating frequencies each with a resonant-loop antenna. Even trained miners were confused when reconnecting the four separate loop antennas during a required relocation change.

Repeaters are required in the conductor waveguide to overcome the 17-dB MF band signal loss when passing through a power center. The MF band signals couple to nearby conductors experiencing a few-dB of coupling lost.

Miners have requested that a single antenna be used at a repeater site. In tests, metal cabinets resembling stainless steel attaché cases were used as enclosures for the portable and repeater transceivers. The miners recommended that the transceivers be designed for installation in two-inch diameter stainless steel tubular enclosures and installed in roof bolt holes. This installation method was expected to survive an explosion or fire.

The MF band transceivers worn by miners included a digital data transmission capability employing frequency shift key (FSK) modulation for digital data transmission of the application data with bit error detection and correction protocols. Miners found that digital control and monitoring communications required high signal-to-noise ratios resulting in shorter distances than analog voice communications.

The magnetic dipole antennas 122, 216, and 310 can be switched to series resonant condition when a push-to-talk (PTT) voice or data transmission is needed. The transceiver provides simplex/half duplex wireless communications between a miner-on-the-move and the distributed antenna and transmission facility. The transceiver series-to-parallel switch connects the magnetic dipole antenna in a parallel resonant condition. This design allows the transceiver to monitor the distributed antenna and transmission lifeline conductor waveguide for radiated signals, including the modulated carrier frequency traffic and radio frequency interference (RFI) spectral density generated by electrical equipment powered from the mine AC power distribution cables.

In one embodiment, the MF band transceivers send fixed-length digitally encoded packet messages for voice and data (e.g., text, location, or ID sensor values). The base band processor (CML) decodes and assembles the packet message. The messages are 48-bytes in length with 4-bytes to identify the type of message and provide control information. The synchronization preamble requires 8-bytes for a total packet length of 52-bytes for the application payload.

The transceiver, transmission facility traffic monitoring mode, employs a media access control (MAC) layer. The carrier sensing, multiple access with collision avoidance protocol is applied in the traffic-monitoring mode. Detecting a traffic null, a dithered time period elapses before a packet transmission starts. The random back-off time period reduces the likelihood of packet collisions in the transmission facility. The MAC layer adds a header to each packet transmission containing the destination address and other information. The physical layer overhead adds 10-bytes bringing the packet to 71-bytes. The 26-kilobits/second data rate requires a packet transmission period of 22-milliseconds. Alternatively, the transmissions on one sub-channel allow simultaneous reception on a second sub-channel, resulting in zero latency in the transmission path.

The transmission facility repeater-transceivers are built with circuits described that are separated by 5,000 to 10,000-feet. Parallel entries driven into the coal block each have installed lifeline conductor waveguides. The conductor waveguides are connected together at the specified separation distance. Each parallel conductor waveguide is brought together at a common point, but insulated from each other. A repeater-transceiver is installed in a protective borehole near the common point such that the magnetic dipole antenna inductively induces approximately an equal carrier frequency signal current in each conductor. Reciprocity applies and the packet traffic carrier frequency signal current flowing in each conductor waveguide, by Ampere's law, generates a magnetic field along the distributed antenna. The magnetic field component near by the antenna induces electromotive force signals in the magnetic dipole antenna during the monitoring mode. The conductor waveguides are also inductively coupled together when installed in a confined area and couple across breakers in otherwise continuous cables. A break of at least 50-feet is required to create an radio frequency signal block. The repeater network provides radio coverage over miles of entries.

One advantage of separating repeaters by 5,000 to 10,000 feet is that only one rechargeable battery pack is required per mile of entries. This compares favorably with very high frequency (VHF)/UHF networks.

The repeater-transceivers have been designed with 1.66-inch diameter cylindrical enclosures for insertion into roof bolt holes. The enclosures have achieved MSHA flameproof approvals. The cylindrical enclosures have internal rechargeable batteries protected by redundant current trip circuits. A flameproof enclosure used for protective burial, and includes a graphical display for text messaging.

An EM-Gradiometer can be used on the surface or flying above to detect the TTE signal from a system refuse chamber or cap-lamp transceiver via long horizontal electric dipoles installed in every entry. It is hand carried on the surface, or flown on an unmanned aerial vehicle (UAV) to pinpoint the location of trapped miners by sensing the origin of the transmitted signal. What it's looking for are any TTE EM waves that travel upward through the layered earth below.

If the maximum response of an EM-Gradiometer is correlated with global positioning system (GPS) information and mine maps, the miner's location within the mining complex and their depth below the surface can be surmised. EM-Gradiometers are modified to display text messages sent from a tracking beacon sent from a refuse chamber or cap-lamp battery transceiver.

Any TTE system design approach that attempts to solve the problem by maximizing the radiating antenna magnetic moment faces formidable problems of a very large antenna surface area requirement and very high transmit power levels. A common approach to this problem is overpowering the transmitter antenna. However, this scheme is impractical because overcoming a 10-dB loss requires an increase in transmitter power received by a factor of ten, which quickly becomes impractical in a mine environment. Alternatively, a feasible solution to dealing with the extraordinary high pass transmission loss factor is found in state-of-the-art receiver design, which can be achieved through a gradiometric receiver design.

Electromagnetic gradiometer receivers use co-polarized magnetic dipole antennas to overcome the impacts of surface RFI, surface interface reflections, and natural attenuation of EM signals traveling through the Earth.

In general, underground mine communications device embodiments of the present invention augment primary leaky-feeder type and mesh type radio systems with a survivable, post-accident, self-escape (SPASE) communications and tracking capability. A wearable caplamp transceiver bridge (CLTB) is fitted with a very high frequency (VHF) radio transceiver, an ultra high frequency (UHF) radio transceiver, a medium frequency (MF band) radio transceiver, an ultra-low frequency (ULF) radio transceiver, a two-way bridging matrix connected between each and every one of the VHF-UHF-MF band ULF radio transceivers and for selecting channel connections amongst them, and a demodulator-modulator electronically insertable into selected the channels in the bridging matrix and for providing modulation transformations between types and rates of radio carrier modulation and analog-to-digital and digital-to-analog conversions. All of which are fully disposed within the CLTB.

A dual frequency "life-line" is physically distributed throughout an underground mine and has conductors included to carry at least one of ULF and MF band radio communications between the CLTB and any other points along its length. A bore-hole mountable MF band to ULF band repeater transceiver bridge (RTB) is coupled in so a "life-line" can be operated in the ULF band for TTE communications.

Tracking is enabled by way-side UHF band active transmitters, e.g., 318 in FIG. 3. A modem can be included for a wireless link to a wearable gas monitor worn by mine supervisors. The radios can audio alert self-escaping miners with crosscut, entry number, and environment gas conditions while moving through vision-impaired escape-ways.

Medium frequency (MF band) band conversion repeaters will automatically reinstate communications between primary VHF/UHF band radios for post-accident self-escape and rescue communications within underground mines and collapsed structures. When each wearable MF band conversion repeater receives ordinary VHF/UHF band signals from the primary hand-held radios used by other miners and rescue teams, it wirelessly retransmits them as MF band signals. MF band signals can easily illuminate nearby infrastructures that can function as robust electrical conductors. VHF/UHF band signals cannot.

Induced electrical currents in the MF bands can move along conductors with a low attenuation rate of only 2-dB per kilometer. Such current flows naturally generate magnetic fields along conductors, even those tens of kilometers long. Any other of our cap-lamp transceivers that happen along that path will privately retranslate those MF band signal back into their original VHF/UHF bands for local reception. The primary hand-held VHF/UHF band radios everyone has are thereby re-enabled by this system to provide dependable audio band voice and message alerts. Even radio communications with the surface can be made possible by through-the-earth (TTE) retransmissions on the ultra low frequency (ULF) using another set of repeater-transceivers on the MF band. A simple "life-line" electrical conductor installed mine-wide is all the support needed to enable the dual frequency band and TTE coverage proposed here.

The MF band frequency band transceivers can operate with a single resonate ferrite rod antenna with a Q of ten, a 30-kHz bandwidth. There are four subcarriers, each with 6.25 kHz bandwidth. The modulators employ spectral band limiting so that that the same antenna can simultaneously RX an TX.

Figure 4:
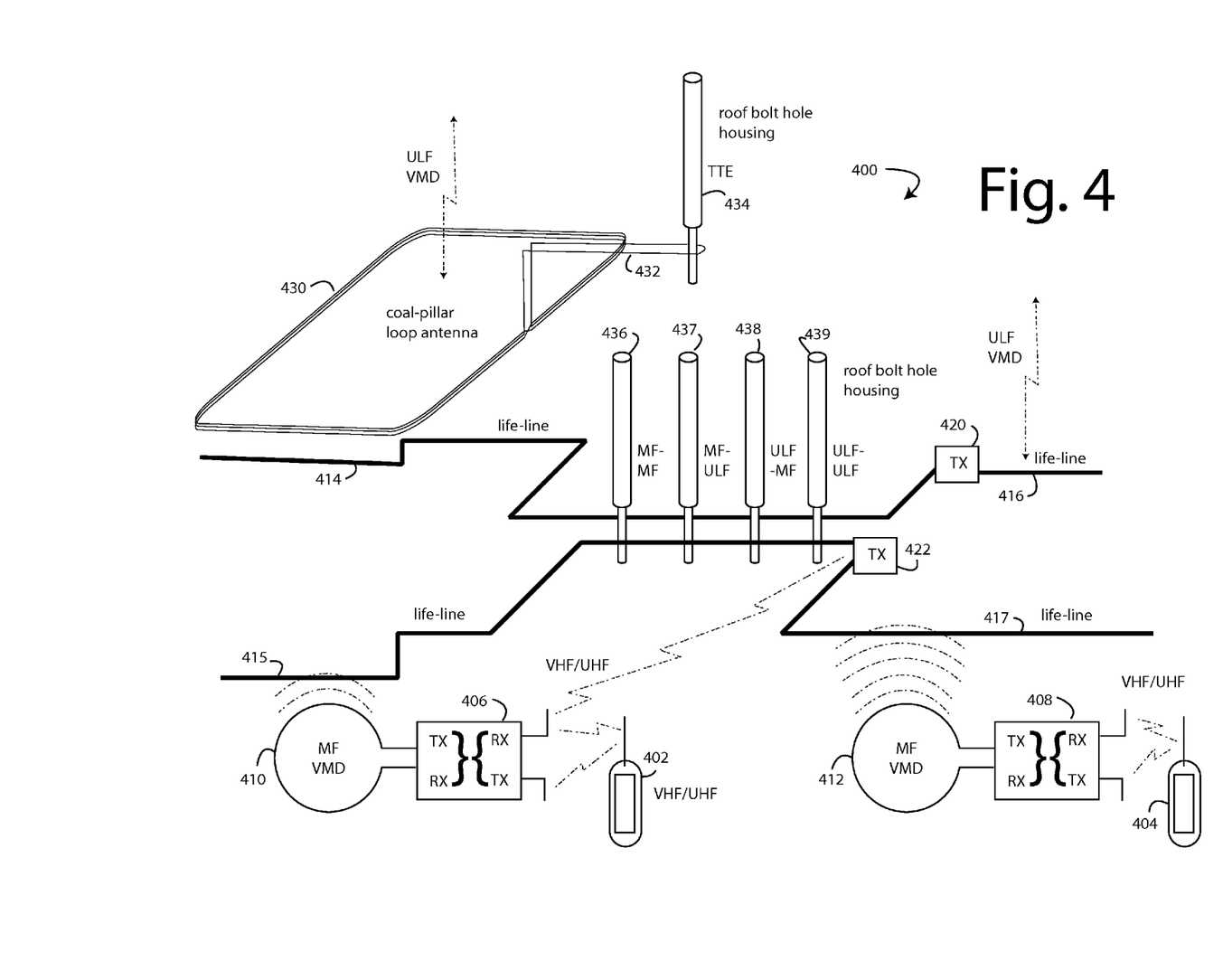
FIG. 4 is a schematic diagram of an enhancement system embodiment that can help communications survive disruptions in underground mines.

FIG. 4 represents a wireless bridge repeater system 400 for enhancing an underground VHF/UHF band type primary communications system to make mine-wide communications survivable in the face of common mining catastrophes. A typical leaky-feeder type and mesh type radio system with VHF/UHF band handheld transceivers (handsets) 402 and 404 are conventionally carried just about everywhere by just about everyone in the normal day-to-day operations of a typical mine.

These VHF/UHF band handheld transceivers 402 and 404 are survivability enhanced and supported by wearable caplamp transceiver bridge (CLTB) embodiments of the present invention, e.g., 406 and 408. The CLTB's are built into a lightweight package that can be worn by a coal miner or other user on their utility belt or preferably clipped onto or built into their hardhat.

An air-core loop-type medium frequency (MF band) vertical magnetic dipole (VMD) antenna 410 and 412 is preferably mounted around the lower brim of a typical plastic hardhat. Such MF band VMD antennas 410 and 412 will be about nine inches in diameter. The intent is for the MF band VMD antennas 410 and 412 to be naturally oriented during use to propagate vertical dipoles inside a mine.

The vertical orientations of the MF band VMD antennas 410 and 412 allow them to couple with horizontally laying copper-core "life-line" cords 414-417 that are purposely strung along the entries throughout a typical mine. Some Jurisdictions actually require the installation of life-lines in active mines to help escape by showing the way out.

The conductor cores inside the "life-line" cords 414-417 can be directly connected to fixed position VHF/UHF band to-MF band repeaters 420 and 422. They may also be inductively coupled. These are functionally similar to CLTB's 406 and 408. The MF band signals from VHF/UHF band to-MF band repeaters 420 and 422, and CLTB's 406 and 408, will also efficiently couple into and be carried long horizontal distances by random pipes, wires, cable, and even conveyor belt systems common to many mines. These features will often survive even major disruptions in a mine's infrastructure.

Ultra low frequency (ULF) transmissions have very long wavelengths and ordinarily require large loop antennas if they are to couple TTE communications up to the surface. A typical coal pillar hundreds of feet long and hundreds of feet wide is conventionally wound with a coal-pillar loop antenna 430. But these have proven to be impractical.

Embodiments of the present invention press the copper-core "life-line" cords 414-417 into ULF radio service as a horizontal electric dipole (HED) antenna. ULF communicates TTE with the surface. The copper-core "life-line" cords 414-417 will easily be over a wavelength log, even at ULF.

A TTE transmitter 434 mounted within a roof-bolt hole sized enclosure. For example, a few feet long and 1.66" to two inches in diameter and made of stainless steel.

The copper-core "life-line" cords 414-417 are therefore referred to herein as "dual frequency", e.g., MF band and ULF. Coupler wire 432 joins ULF communications into the "life-line" cords 414-417. These can be picked up and amplified by a variety of repeaters 436-439 for MF band MF band, MF band ULF, ULF-MF band, and ULF-ULF bridging and repeating.

Although the present invention has been described in terms of the presently preferred embodiments, it is to be understood that the disclosure is not to be interpreted as limiting. Various alterations and modifications no doubt become apparent to those skilled in the art after having read the above disclosure. Accordingly, it is intended that the appended claims be interpreted as covering all alterations and modifications as fall within the "true" spirit and scope of the invention.

What is claimed is:

1. A radio transceiver bridge, comprising:
a very high frequency (VHF) and/or ultra high frequency (UHF) radio transceiver capable of operating with a particular choice of access modes, modulation, transmit frequencies, bandwidth, and power levels, and having a voice input and output;
a vocoder connected to said voice input and output of the radio transceiver, and having digital circuitry to convert analog voice modulation into and out of symbols for four level frequency shift keying (4FSK);
a 4FSK modem connected to exchange said symbols with the vocoder and to provide baseband modulation and demodulation for a local area network;
a medium frequency (MF band) radio transmitter connected to the 4FSK modem and for providing a wireless communication with a nearby linear conductor;
wherein, said nearby linear conductor comprises at least one of a conductive core lifeline or randomly available pieces of rebar, cables, wire, rails, metal supports, pipes, conduits, and conductive metal; and
a loop antenna connected to and tuned for operation with the MF band radio transmitter, and having a clip or other device for a user to attach it to themselves and to be worn as they move about;
wherein, nearby VHF/UHF band radio communications from independent devices are automatically received, demodulated, re-modulated, and retransmitted with MF band radio carriers through the loop antenna to any nearby horizontally oriented conductors.

2. The radio transceiver bridge of claim 1, further comprising:
a MF band radio receiver and demodulator configured to receive another voice and/or data in said second modulation format;
a modulation converter for translating said another voice and/or data communications between said second modulation format and said first modulation format;
a VHF/UHF band radio transmitter connected to retransmit said another voice and/or data in said first modulation format; and
another loop antenna connected to and tuned for operation with the MF band radio receiver and configured to be mounted in or on the brim of said hardhat such that it will be naturally oriented to sense a vertical magnetic field above and below the hardhat;
wherein, MF band radio carriers detected by the another loop antenna from any nearby horizontally oriented conductors inside said tunnel or mineshaft are automatically received, demodulated, re-modulated, and retransmitted for reception by said independent VHF/UHF band radio communications devices.

3. The radio transceiver bridge of claim 2, wherein:
the loop antennas can be one and the same and configured to serve both reception and transmission of MF band radio signals.

4. The radio transceiver bridge of claim 1, further comprising:
mounting brackets and a battery for portable operation and wear by a user on either the hardhat or a belt, or both.

5. The radio transceiver bridge of claim 1, further comprising:
mounting brackets and a power source for fixed operation inside a tunnel or mine.

6. The radio transceiver bridge of claim 1, further comprising:
a voice synthesizer connected to receive data demodulated by the modulation converter, and configured to convert such data to speech, and connected to the VHF/UHF band transmitter to add a synthesized voice that speaks the converted data in messages;
wherein, a user of said independent VHF/UHF band independent devices can nevertheless benefit from a message they are otherwise unable to view on screen.

7. A through-the-earth (TTE) radio transceiver bridge for communications between the surface and users underground below, comprising:
a medium frequency (MF band) radio receiver and demodulator to receive voice and/or data in a first modulation format;
a modulation converter for translating voice and/or data communications between said first modulation format and a second modulation format;
an ultra-low frequency (UHF) radio transmitter connected to retransmit said voice and/or data in said second modulation format;
a roof bore-hole mounting enclosure and housing for supporting and operating said receivers, modulation converters, and transmitters within; and
a coal-pillar loop antenna connected to and tuned for operation with the ULF radio transmitter and configured to be installed in underground entries and crosscuts such that it will be naturally oriented to produce a vertical magnetic field able to reach above to the surface;
wherein, VHF/UHF band radio communications from independent devices bridged in with MF band carriers are automatically received, demodulated, re-modulated, and retransmitted with ULF radio carriers through the loop antenna as TTE communications to the surface above.

8. The TTE radio transceiver bridge of claim 7, further comprising:
a ULF radio receiver and demodulator configured to receive another voice and/or data in said second modulation format;
a modulation converter for translating said another voice and/or data communications between said second modulation format and said first modulation format;
a MF band radio transmitter connected to retransmit said another voice and/or data in said first modulation format; and
wherein, said coal-pillar loop antenna is also connected to and tuned for operation with the ULF radio receiver;
wherein, ULF radio carriers detected by the coal-pillar loop antenna from the surface above are automatically received, demodulated, re-modulated, and retransmitted by the MF band radio transmitter to be ultimately converted for and received by said independent VHF/UHF band radio communications devices.

9. The TTE radio transceiver bridge of claim 8, further comprising:
a radio coupling means for linking both the MF band radio transmitter and MF band radio receiver to a life-line conductor horizontally disposed within an underground mine or tunnel.

10. The TTE radio transceiver bridge of claim 8, further comprising:
- an MF band to-MF band repeater for boosting MF band transmissions along a life-line conductor horizontally disposed within an underground mine or tunnel;
- wherein the MF band to-MF band repeater can be separately disposed in its own roof bore-hole enclosure.

11. The TTE radio transceiver bridge of claim 8, further comprising:
- a cylindrical stainless steel tubular enclosure rated for installation in coalmine roof-bolt holes.

\* \* \* \* \*